United States Patent
Miyasaka et al.

(10) Patent No.: US 10,075,794 B2
(45) Date of Patent: Sep. 11, 2018

(54) SIGNAL PROCESSING DEVICE

(71) Applicant: SOCIONEXT INC., Kanagawa (JP)

(72) Inventors: Shuji Miyasaka, Osaka (JP); Kazutaka Abe, Osaka (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 15/671,461

(22) Filed: Aug. 8, 2017

(65) Prior Publication Data

US 2017/0339502 A1 Nov. 23, 2017

Related U.S. Application Data

(63) Continuation of application No. PCT/JP2016/051640, filed on Jan. 21, 2016.

(30) Foreign Application Priority Data

Feb. 25, 2015 (JP) .................. 2015-035611

(51) Int. Cl.
  *H04S 1/00* (2006.01)
  *A63F 13/54* (2014.01)
  *A63F 13/5255* (2014.01)

(52) U.S. Cl.
  CPC ............. *H04S 1/002* (2013.01); *A63F 13/54* (2014.09); *H04S 1/007* (2013.01); *A63F 13/5255* (2014.09); *A63F 2300/6063* (2013.01)

(58) Field of Classification Search
  CPC ............. H04S 5/02; H04S 7/00; H04R 3/00
  USPC .......... 381/303, 300, 27, 17, 18, 86
  See application file for complete search history.

(56) References Cited

U.S. PATENT DOCUMENTS 6,026,169 A * 2/2000 Fujimori .............. H04S 1/005
  381/17
2007/0171944 A1 7/2007 Schuijers et al.

FOREIGN PATENT DOCUMENTS

| JP | H06-098400 A | 4/1994 |
| JP | 07288897 A * | 10/1995 |
| JP | H07-288897 A | 10/1995 |
| JP | H09-233599 A | 9/1997 |
| JP | 2007-531915 A | 11/2007 |

OTHER PUBLICATIONS

International Search Report (ISR) dated on Mar. 15, 2016 in International (PCT) Application No. PCT/JP2016/051640, with English translation.
Written Opinion of the International Searching Authority dated on Mar. 15, 2016 in International ApplicationNo.PCT/JP2016/051640 with partial English translation.
Jens Blauert et al., "Spatial Hearing" Kajima Institute Publishing Co., Ltd., p. 138, Jul. 10, 1986, with Partial English translation.

* cited by examiner

*Primary Examiner* — Melur Ramakrishnaiah
(74) *Attorney, Agent, or Firm* — McDermott Will & Emery LLP

(57) ABSTRACT

A signal processing device includes phase rotation units which rotate a phase of a signal A and generate two signals having a phase difference of θ, and a control unit which performs transition of θ over time. The control unit controls phases so that θ is approximately 0 degrees at a time point T0 and θ is approximately 180 degrees at a time point T1.

4 Claims, 6 Drawing Sheets

SIGNAL PROCESSING DEVICE

CROSS REFERENCE TO RELATED APPLICATION

This is a continuation application of PCT International Application No. PCT/JP2016/051640 filed on Jan. 21, 2016, designating the United States of America, which is based on and claims priority of Japanese Patent Application No. 2015-035611 filed on Feb. 25, 2015. The entire disclosures of the above-identified applications, including the specifications, drawings and claims are incorporated herein by reference in their entirety.

FIELD

The present disclosure relates to a signal processing device which moves sound images which are localized at a predetermined position to a position of a listener, or moves sound images which are localized at a position of a listener to a predetermined position.

BACKGROUND

Recently, gaming equipment and so on performs processing such as moving sound image localization positions of sound effect and voice of characters (audio objects) with respect to a listener over time. Patent Literature (PTL) 1 discloses a technique for localizing audio objects to a predetermined position, and application of such a technique allows processing to move the audio object over time. For example, as illustrated in FIG. 9, sound images localized at the right side (or left side) of the listener can be moved to localize at the left side (or right side) of the listener, over time.

In FIG. 9, 650 is a sound image localization filter which localizes sound images to the left side, and is the sound image localization filter manufactured with the technique disclosed in PTL 1, for example. Likewise, 651 is a sound image localization filter which localizes sound images to the right side. 652 is a synthesis unit for moving the sound images from side to side. When moving the sound images to the left, a coefficient α in the synthesis unit 652 is set to 1. With this, output signals of the left-localization sound Image localization filter 650 are output from speakers 603a and 603b as sounds, thereby localizing the sound Images to the left side. When moving the sound Images to the right, the coefficient α in the synthesis unit 652 is set to 0. With this, the output signals of the right-localization sound image localization filter 651 are output from the speakers 603a and 603b as sounds, thereby localizing the sound images to the right side. Furthermore, setting the value of a between 0 and 1 allows moving the sound images from side to side.

CITATION LIST

Patent Literature

[PTL 1] Japanese Unexamined Patent Application Publication No. 09-233599

SUMMARY

Technical Problem

Application of the structure illustrated in FIG. 9 to the technique disclosed in the above-described PTL 1 allows moving audio objects 662 shown in FIG. 10 from side to side of a listener 660. However, there remains an issue: as the audio objects 662 move closer to a position (the center between the right side and left side) of the listener 660, the audio objects 662 move away from the listener 660 (though it is intended to make them pass close to the listener), and move to a position which is the center between a right speaker and a left speaker. The cause is as follows: the left-localization sound image localization filter 650 and the right-localization sound image localization filter 651 are bilaterally symmetrical, that is, output signals of the left-localization sound image localization filter 650 for the left speaker are (at least approximately) the same as output signals of the right-localization sound image localization filter 651 for the right speaker, and likewise, output signals of the left-localization sound image localization filter 650 for the right speaker are (at least approximately) the same as output signals of the right-localization sound image localization filter 651 for the left speaker.

When α in FIG. 9 is set to 0.5 while the sound images are being moved from the left to the right, since the sound image localization filters are bilaterally symmetrical, a signal for the left speaker and a signal for the right speaker, which are output from the synthesis unit 652, are the same signals. Specifically, monaural signals are output from the right speaker 603a and the left speaker 603b as sounds. In this case, the sound images are localized at a position which is the center between the speaker 603a and the speaker 603b located in the right and left. As a result, the sound images localized about the left ear of the listener move significantly away from the head of the listener while moving toward the right ear of the listener, and move to a position between the speakers (See FIG. 11).

Furthermore, even a combination of PTL 1 and the structure in FIG. 9 cannot provide such an acoustic expression that moves audio objects from the front of a listener toward the listener (or in the opposite direction).

The present disclosure has been conceived in view of the above-described problem in the conventional technique, and has an object to provide a signal processing device which allows moving, without making a listener feel strange, sound images localized at a predetermined position toward a position of the listener, especially in the back and forth and the right and left of the listener.

Solution to Problem

In order to solve the above-described problem, a signal processing device according to a first aspect includes a phase rotation unit A which rotates a phase of a signal A and generates two signals having a phase difference of θ, and a control unit which performs transition of θ over time. The control unit controls phases so that θ is approximately 0 degrees at a time point T0 and θ is approximately 180 degrees at a time point T1.

A signal processing device according to a second aspect has a feature that the phase rotation unit A includes a first phase rotation unit which rotates the phase of the signal A by θ1 degrees and a second phase rotation unit which rotates the phase of the signal A by −θ1 degrees, and θ1 is equal to θ/2.

A signal processing device according to a third aspect includes: a phase rotation unit A which rotates a phase of a signal A and generates two signals having a phase difference of θ; a phase rotation unit B which rotates a phase of a signal B and generates two signals having a phase difference of θ; a first adding unit which adds: a signal obtained by multiplying a first output signal of the phase rotation unit A by a coefficient G1; and a signal obtained by multiplying a first output signal of the phase rotation unit B by a coefficient G2; a second adding unit which adds: a signal obtained by multiplying a second output signal of the phase rotation unit A by the coefficient G2; and a signal obtained by multiplying a second output signal of the phase rotation unit B by the coefficient G1; and a control unit which performs transition of θ, the coefficient G1, and the coefficient G2, over time. The control unit controls phases so that θ is approximately 0 degrees at a time point T0 and θ is approximately 180 degrees at a time point T1, and controls the coefficient G1 and the coefficient G2 so that the coefficient G1 is g when θ is 0 degrees and is h when θ is 180 degrees, and the coefficient G2 is 0 when θ is 0 degrees and is h when the θ is 180 degrees, g being a positive value and h being a positive value smaller than g.

A signal processing device according to a fourth aspect has a feature that the control unit controls the coefficient G1 and the coefficient G2 so that the coefficient G1 is 0 when θ is 360 degrees and the coefficient G2 is g when θ is 360 degrees.

A signal processing device according to a fifth aspect has a feature that the phase rotation unit A includes a first phase rotation unit which rotates the phase of the signal A by θ1 degrees and a second phase rotation unit which rotates the phase of the signal A by −θ1 degrees, the phase rotation unit B includes a third phase rotation unit which rotates the phase of the signal B by −θ1 degrees and a fourth phase rotation unit which rotates the phase of the signal B by θ1 degrees, and θ1 is equal to θ/2.

A signal processing device according to a sixth aspect has a feature that the signal A and the signal B are signals generated by a sound image localization filter for localizing a sound image of a signal S at a predetermined position by two speakers.

Advantageous Effects

According to the first aspect of the present disclosure, sound images localized at a predetermined position can be gradually moved closer to or away from a listener.

According to the second aspect of the present disclosure, sound images localized at a predetermined position can be gradually moved closer to or away from the listener while maintaining a natural tone.

According to the third aspect of the present disclosure, sound images localized at a predetermined position can be gradually moved closer to or away from the listener with a virtual sound image localization technique.

According to the fourth aspect of the present disclosure, sound images localized at a predetermined position can be gradually moved closer to the listener, then gradually moved away from the listener, and localized at a position which is bilaterally symmetrical from a position where the sound images are originally localized.

According to the fifth aspect of the present disclosure, sound images localized at a predetermined position can be gradually moved closer to or away from the listener while maintaining a natural tone, with a virtual sound image localization technique.

According to the sixth aspect of the present disclosure, the virtual sound image localization technique and the sound image localization processing according to the third aspect can be processed in an integrated manner.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Embodiment 1

The following describes an embodiment as an aspect of a signal processing device. Each of the embodiments described below is a mere example of the present disclosure. The numerical values, shapes, materials, constituent elements, the arrangement and connection of the constituent elements, etc. shown in the following embodiments are mere examples, and thus do not limit the present disclosure. The present disclosure is determined only by the statement in claims. Accordingly, out of the constituent elements in the following embodiments, the constituent elements not stated in the independent claims are not necessary for achieving the object of the present disclosure and are described as arbitrary constituent elements.

(Embodiment 1)

A signal processing device according to Embodiment 1 will be described with reference to the Drawings.

In the present embodiment, description will be provided on a technique for moving sound images of monaural signals over time, i.e., a technique which provides an acoustic effect which makes a listener feel as if sound images, localized right in front of the listener (at the center of stereo speakers) at a predetermined time point, move closer to the listener over time.

In the present embodiment, a phenomenon so-called inside-the-head-localization is used. Description of the phenomenon is as follows: in reproducing monaural signals with stereo speakers, when one of the speakers outputs the monaural signal directly as a sound and the other speaker outputs a signal obtained by inverting the phase of the monaural signal as a sound, a listener has an illusion that sound images of the monaural signals have localized in the listener's head (see Non-Patent Literature 1: page 138 of Spatial Hearing, Jens Blauert et al., Kajima Institute Publishing Co., Ltd.).

Figure 1:
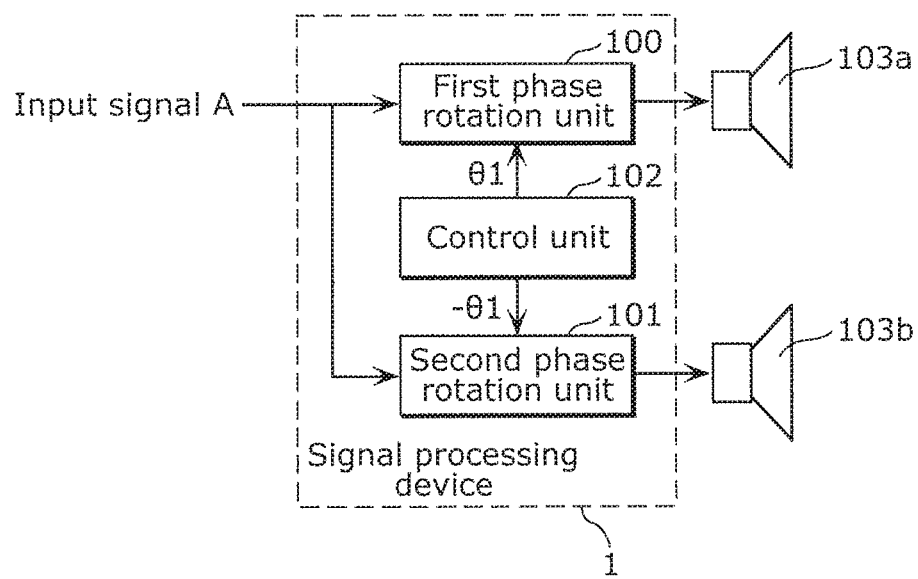
FIG. 1 is a diagram Illustrating a structure of a signal processing device according to Embodiment 1.

FIG. 1 is a diagram illustrating a structure of a signal processing device according to the present embodiment.

In FIG. 1, 100 is a first phase rotation unit which rotates a phase of an input signal A by θ1 degrees. 101 is a second phase rotation unit which rotates the phase of the input signal A by −θ1 degrees. 102 is a control unit which performs transition of θ1 over time. 103a and 103b are stereo speakers which output output signals of the first phase rotation unit 100 and the second phase rotation unit 101 as sounds, respectively.

Description will be provided on an operation performed by the signal processing device having the above-described configuration.

First, at a time point 0, the control unit 102 sets θ1 to 0 degrees. With this, the first phase rotation unit 100 rotates the phase of the input signal A by 0 degrees. In the same manner, the second phase rotation unit 101 rotates the phase of the input signal A by 0 degrees. The stereo speakers 103a and 103b output the output signals of the first phase rotation unit 100 and the output signals of the second phase rotation unit 101 as sounds, respectively. With this, the same sounds are output from the stereo speakers 103a and 103b in the right and left, which causes the sound images to be localized at the center between the stereo speakers 103a and 103b in the right and left.

At the next time point (10 msec later for example), the control unit 102 sets θ1 to 1 degree. With this, the first phase rotation unit 100 rotates the phase of the input signal A by 1 degree. In the same manner, the second phase rotation unit 101 rotates the phase of the input signal A by −1 degree. The stereo speakers 103a and 103b output the output signals of the first phase rotation unit 100 and the output signals of the second phase rotation unit 101 as sounds, respectively.

In this manner, the control unit 102 increments θ1 gradually as time elapses. Accordingly, the first phase rotation unit 100 and the second phase rotation unit 101 rotate the phases of the respective Input signals.

Assume that some time passes and the control unit 102 has set θ1 to 90 degrees at a time point T. In this case, a phase difference between the output signal of the first phase rotation unit 100 and the output signal of the second phase rotation unit 101 is 180 degrees. Thus, the sounds of signals output by the stereo speakers 103a and 103b have phases inverted from each other. This produces the state of the inside-the-head-localization described in the beginning of the present embodiment, which makes the listener have an illusion that the sound images are localized in the listener's head.

Controlling 81 by the control unit 102 in the above-described manner allows the sound images localized in front of the listener at the time point 0 to gradually move, and to be localized inside the head of the listener at the time point T, thereby providing such an acoustic expression that makes the listener feel as if the sound images move closer to the listener over time.

In the present embodiment, an initial value of the phase with respect to the time point is set to 0 degrees. However, the initial value need not be set to 0 degrees and may be set to 30 degrees, for example. In this case, at the time point T, the first phase rotation unit 100 rotates the phase by 120 (=30+90) degrees and the second phase rotation unit 101 rotates the phase by −60 (=30−90) degrees. In other words, it is sufficient that the phases are the same at the time point 0 and are inverted at the time point T, and it is not necessary for the phase angle rotated by the first phase rotation unit 100 and the phase angle rotated by the second phase rotation unit 101 to have a same absolute value.

Figure 2:
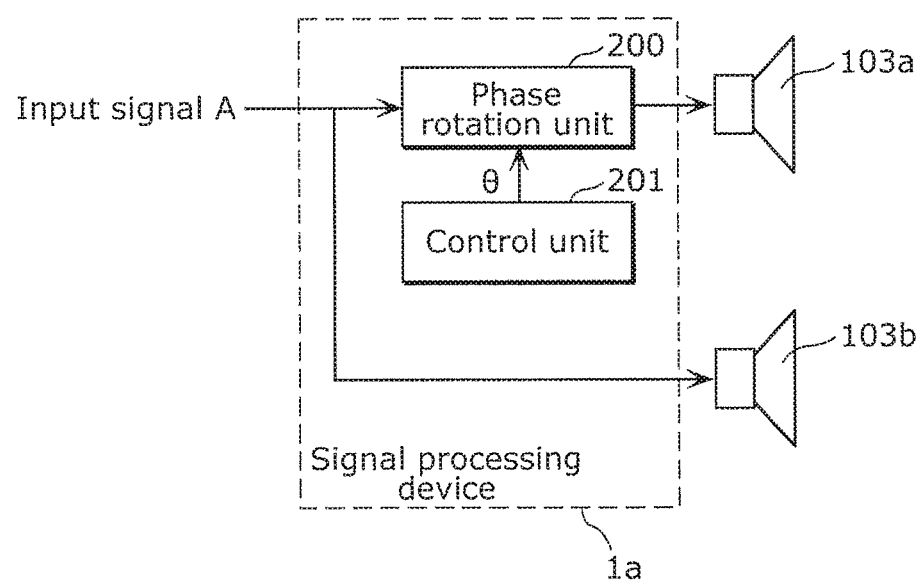
FIG. 2 is a diagram illustrating a structure of a simplified version of the signal processing device according to Embodiment 1.

Furthermore, control may be performed to set the phase difference to 180 degrees at the time point T, by fixing one of the rotation angles and updating only the other rotation angle. FIG. 2 illustrates the structure in the above-described case. Note that, in FIG. 2, a delay unit which is required on a path to the stereo speaker 103b in the lower side is not shown. The delay unit provides the same time delay as the time delay which occurs in the phase rotation unit 200. The structure in FIG. 2 is simpler than the structure in FIG. 1. However, there remains an issue with the structure in FIG. 2: one of the speakers outputs, as sounds, signals with no phase rotation at all, which causes sounds from both speakers to have different tones. With the structure in FIG. 1, the sounds have even tones since signals from both phase rotation units go through the phase rotation processing, which allows performing the sound image moving processing while maintaining a natural tone.

Furthermore, the first phase rotation unit 100 and the second phase rotation unit 101 may perform the phase rotation only on low frequency components out of the frequency components of the input signal A. For example, the phase rotation may be performed only on frequency components equal to or less than 1.5 kHz, where the inside-the-head-localization phenomenon due to reversed phase component is outstanding.

The present embodiment has provided the acoustic expression which makes the listener feel as if the sound images gradually move closer to the listener. This technique also provides an acoustic expression which makes the listener feel as if the sound images inside the head of the listener gradually move away from the listener. Specifically, θ1 is set to 90 degrees at the time point 0 and decremented over time. Eventually, θ1 becomes 0 degrees at the time point T. With this, the sound images localized inside the head of the listener are moved to the front of the listener at the time point T.

Figure 3:
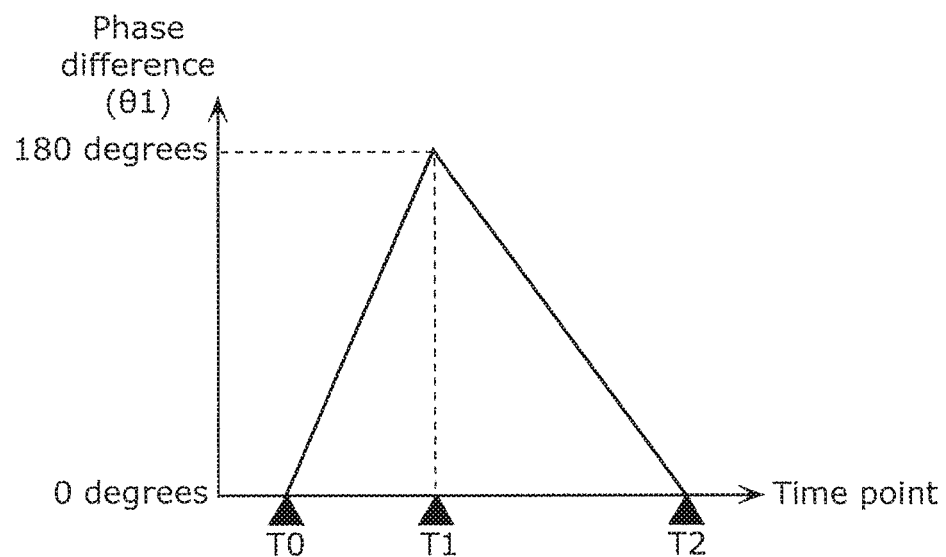
FIG. 3 is a figure showing an example of phase difference transition.

FIG. 3 shows an example showing how the transition of a phase difference (θ1) goes over time. In this example, the sound images are at a position away from the listener at the time point T0, gradually move closer to the listener over time, and reach the closest to the listener at the time point T1. Moreover, the sound images gradually move away from the listener over time and are localized at an original position that is away from the listener.

Needless to say, the phase difference transition shown in FIG. 3 is a mere example. It is not limited to the transition in a linear manner as shown in FIG. 3 nor to the transition starting from phase difference 0 at the time point T0 and to be incremented.

As described above, with the present embodiment, the signal processing device includes a first phase rotation unit 100 which rotates the phase of the signal A by θ1 degrees and a second phase rotation unit 101 which rotates the phase of the signal A by −θ1 degrees, and a control unit 102 which performs the transition of θ over time. The control unit 102 controls phases so that θ1 is approximately 0 degrees at a time point T0 and θ1 is approximately 90 degrees at a time point T1. With this, such an acoustic expression can be provided which makes a listener feel as if the sound images localized in front of the listener move closer to the listener or as if the sound images localized at the position of the listener gradually move away from the listener.

(Embodiment 2)

Figure 4:
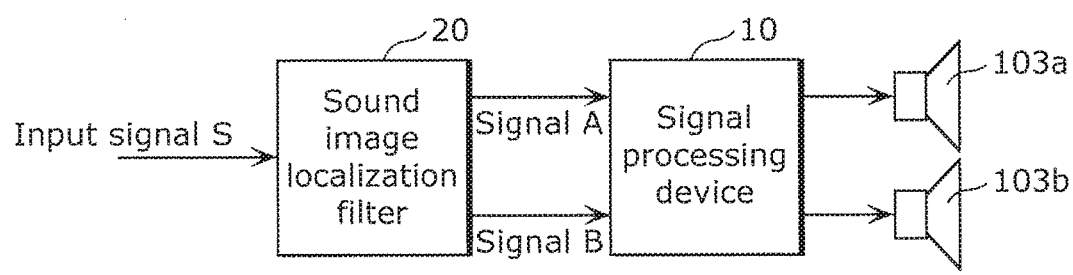
FIG. 4 is a diagram illustrating a structure for using a sound image localization filter in combination with the signal processing device.

A signal processing device according to Embodiment 2 will be described with reference to the Drawings. In the present embodiment, description will be provided on a technique for moving, by a sound image localization filter, sound images localized at a predetermined position over time. Description will be provided on a technique which makes a listener feel as if sound images localized at a predetermined position at a predetermined time point move closer to the listener over time. Specifically, as illustrated in FIG. 4, a monaural signal is processed by a sound image localization filter 20, and sound images of two signals output from the sound image localization filter 20 are moved by a signal processing device 10 to be described in the present embodiment. Here, the sound image localization filter 20 can be of any form. For example, the sound image localization filter disclosed in PTL 1 may be adopted.

In the present embodiment, a phenomenon so-called inside-the-head-localization is used. Description of the phenomenon is as follows: in reproducing a monaural signal with stereo speakers, when one of the speakers outputs the monaural signal directly as a sound while the other speaker outputs a signal obtained by inverting the phase of the monaural signal as a sound, a listener has an Illusion that sound images of the monaural signals have localized in the listener's head.

Figure 5:
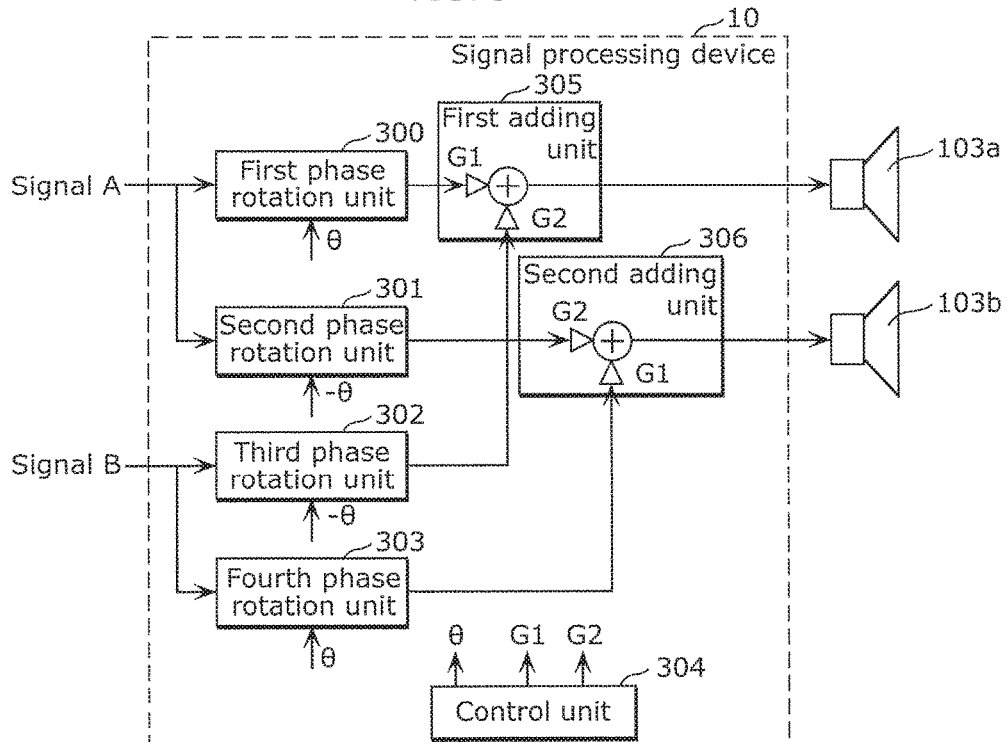
FIG. 5 is a diagram Illustrating a structure of a signal processing device according to Embodiment 2.

FIG. 5 is a diagram illustrating a structure of the signal processing device according to the present embodiment.

The signal processing device 10 in FIG. 4 represents the signal processing device 10 in FIG. 5. The signal A and the signal B in FIG. 4 are the same as the signal A and the signal B in FIG. 5, respectively.

In FIG. 5, 300 is a first phase rotation unit which rotates a phase of the signal A by $\theta$ degrees. 301 is a second phase rotation unit which rotates the phase of the signal A by $-\theta$ degrees. 302 is a third phase rotation unit which rotates a phase of the signal B by $-\theta$ degrees. 303 is a fourth phase rotation unit which rotates the phase of the signal B by $\theta$ degrees. 305 is a first adding unit which adds an output signal of the first phase rotation unit 300 and an output signal of the third phase rotation unit 302. 306 is a second adding unit which adds an output signal of the second phase rotation unit 301 and an output signal of the fourth phase rotation unit 303. 304 is a control unit which performs the transitions of, over time, (i) $\theta$ and (ii) coefficients (G1 and G2) indicating weights of signals added by the first adding unit 305 and the second adding unit 306. 103a and 103b are stereo speakers which output the output signals of the first adding unit 305 and the output signals of the second adding unit 306 as sounds, respectively.

Description will be provided on an operation performed by the signal processing device 10 having the above-described configuration.

First, at a time point 0, the control unit 304 sets $\theta$ to 0 degrees, the coefficient G1 (=g) to 1.0, and the coefficient G2 to 0.0. This allows the first phase rotation unit 300 to rotate the phase of the input signal A by 0 degrees, the second phase rotation unit 301 to rotate the phase of the input signal A by 0 degrees, the third phase rotation unit 302 to rotate the phase of the input signal B by 0 degrees, and the fourth phase rotation unit 303 to rotate the phase of the input signal B by 0 degrees.

Next, the first adding unit 305 adds a signal obtained by multiplying the output signal of the first phase rotation unit 300 by 1.0 and a signal obtained by multiplying the output signal of the third phase rotation unit 302 by 0.0. With this, the output signal of the first adding unit 305 is the same as the signal A.

The second adding unit 306 adds a signal obtained by multiplying the output signal of the second phase rotation unit 301 by 0.0 and a signal obtained by multiplying the output signal of the fourth phase rotation unit 303 by 1.0. With this, the output signal of the second adding unit 306 is the same as the signal B.

The stereo speakers 103a and 103b output the output signals of the first adding unit 305 and the output signals of the second adding unit 306 as sounds, respectively.

This allows the right and left speakers to output the sounds of the signal A and the signal B, respectively, and thus the sound images are located at positions at which the sound Images are to be localized by the sound image localization filter 20.

At the next time point (10 msec later for example), the control unit 304 sets $\theta$ to 1 degree, the coefficient G1 to a value (=h) slightly smaller than 1.0, and the coefficient G2 to a value slightly greater than 0.0. This allows the first phase rotation unit 300 to rotate the phase of the input signal A by 1 degree, the second phase rotation unit 301 to rotate the phase of the input signal A by $-1$ degree, the third phase rotation unit 302 to rotate the phase of the input signal B by $-1$ degree, and the fourth phase rotation unit 303 to rotate the phase of the input signal B by 1 degree.

In the present embodiment, the coefficient G1 and the coefficient G2 are defined as $G1=\cos((\theta/2)*\pi/180)$ and $G2=\sin((\theta/2)*\pi/180)$, to simplify the explanation. However, this is not an only example.

Next, the first adding unit 305 adds a signal obtained by multiplying the output signal of the first phase rotation unit 300 by $\cos((1.0/2)*\pi/180)$ and a signal obtained by multiplying the output signal of the third phase rotation unit 302 by $\sin((1.0/2)*\pi/180)$.

The second adding unit 306 adds a signal obtained by multiplying the output signal of the second phase rotation unit 301 by $\sin((1.0/2)*\pi/180)$ and a signal obtained by multiplying the output signal of the fourth phase rotation unit 303 by $\cos((1.0/2)*\pi/180)$.

The stereo speakers 103a and 103b output the output signals of the first adding unit 305 and the output signals of the second adding unit 306 as sounds, respectively.

This causes the sound image localization filter 20 to localize the sounds output from the right and left speakers from the position the sounds are currently localized at to a position closer to the inside the head of the listener to some extent.

In this manner, the control unit 304 gradually causes $\theta$ to approach +90 degrees over time, and the coefficient G1 and the coefficient G2 to approach a same value. Since it is defined that $G1=\cos((\theta/2)*\pi/180)$ and $G2=\sin((\theta/2)*\pi/180)$ in the present embodiment, the coefficient G1 and the coefficient G2 automatically approach the same value as $\theta$ approaches +90 degrees.

Subsequently, when the control unit 304 sets $\theta$ to 90 degrees at the time point T, the first phase rotation unit 300 rotates the phase of the input signal A by 90 degrees, the second phase rotation unit 301 rotates the phase of the input signal A by $-90$ degrees, the third phase rotation unit 302 rotates the phase of the input signal B by $-90$ degrees, and the fourth phase rotation unit 303 rotates the phase of the input signal B by 90 degrees.

The coefficient G1 and the coefficient G2 reach the same value ($\cos(\pi/4)=\sin(\pi/4)$). Thus, the first adding unit 305 (i) adds a signal obtained by multiplying the output signal of the first phase rotation unit 300 by a weight and a signal obtained by multiplying the output signal of the third phase rotation unit 302 by the same weight, and (ii) outputs the resultant signal.

The second adding unit 306 (i) adds a signal obtained by multiplying the output signal of the second phase rotation unit 301 by a weight and a signal obtained by multiplying the output signal of the fourth phase rotation unit 303 by the same weight, and (ii) outputs the resultant signal.

The stereo speakers 103a and 103b output the output signals of the first adding unit 305 and the output signals of the second adding unit 306 as sounds, respectively.

With this, the upper stereo speaker 103a outputs the following sound:
(a signal obtained by rotating the phase of the signal A by 90 degrees+a signal obtained by rotating the phase of the signal B by −90 degrees)*sin(π/4), and
the lower stereo speaker 103b outputs the following sound:
(a signal obtained by rotating the phase of the signal A by −90 degrees+a signal obtained by rotating the phase of the signal B by 90 degrees)*sin(π/4).

Thus, the signals have the phase difference of 180 degrees, that is, the phases are inverted, which causes the sound images of the output sounds localized inside the head of the listener.

Controlling in the above-described manner provides such an acoustic effect that the sound images localized at a predetermined position at the time point 0 gradually move closer to the listener and are localized inside the head of the listener at the time point T.

The present embodiment has provided the acoustic expression which makes the listener feel as if the sound images gradually move closer to the listener. This technique also provides an acoustic expression which makes the listener feel as if the sound images inside the head of the listener gradually move away from the listener. Specifically, θ is set to 90 degrees at the time point 0 and decremented over time. Eventually, θ becomes 0 degrees at the time point T. With this, the sound images localized inside the head of the listener are moved, by the sound image localization filter 20, to positions at which the sound images are to be localized.

Figure 6:
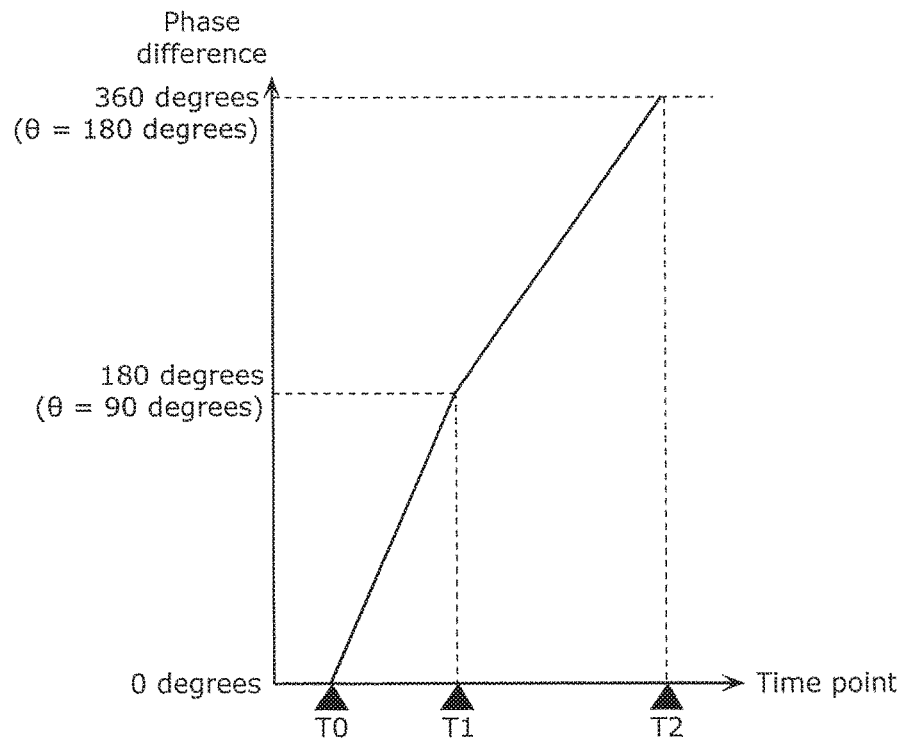
FIG. 6 is a figure showing another example of phase difference transition.

Furthermore, transition as shown in FIG. 6 provides such an effect that the sound images move closer to the listener one time, move away from the listener, and move closer to a position which is bilaterally symmetrical from the position at which the sound images originally localized. Setting θ to 0 degrees (phase difference 0 degrees) at the time point T0, 90 degrees (phase difference 180 degrees) at the time point T1, and 180 degrees (phase difference 360 degrees) at the time point T2 allows providing such an acoustic effect that the sound image gradually move closer to the listener and then move away from the listener.

Here, even after θ is over 90 degrees, the coefficient G1 can be G1=cos((θ/2)*π/180) and the coefficient G2 can be G2=sin((θ/2)*π/180). With this, when θ is 180 degrees (phase difference 360 degrees), G1 is 0.0 and G2 (=g) is 1.0. Thus, the speaker 103a outputs the signal B (phase is inverted) as a sound and the speaker 103b outputs the signal A (phase is inverted) as a sound. Specifically, the sounds of the signals whose phases are inverted in the right and left as compared with the case when θ is 0 degrees are output from the stereo speakers.

Figure 7:
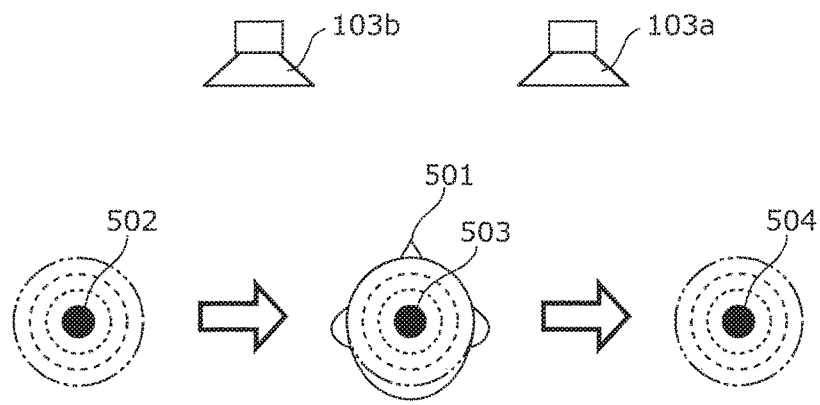
FIG. 7 is a figure showing an effect produced by Embodiment 2.

FIG. 7 is a figure showing the effect. In FIG. 7, 501 indicates a listener, and 502 to 504 indicate virtual sound source positions at time points T0, T1, and T2, respectively. Controlling in the above-described manner provides such an effect that the virtual sound source position 502 moves closer to the listener 501 from the listener's left side, passes through a position inside the head of the listener 501, and moves away from the listener 501 toward the listener's right side.

Furthermore, the first phase rotation unit 300, the second phase rotation unit 301, the third phase rotation unit 302, and the fourth phase rotation unit 303 may perform the phase rotation only on low frequency components out of the frequency components of the input signal A. For example, the phase rotation may be performed only on frequency components equal to or less than 1.5 kHz, where the inside-the-head-localization phenomenon due to reversed phase component is outstanding.

Figure 8:
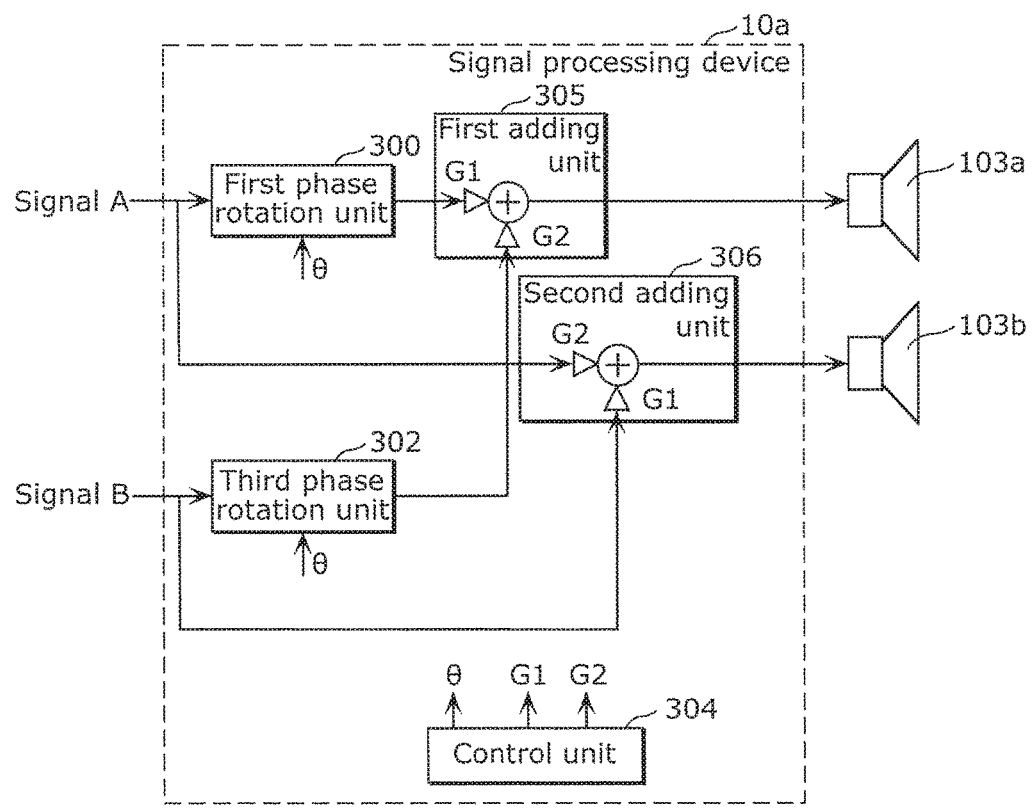
FIG. 8 is a diagram illustrating a structure of a simplified version of the signal processing device according to Embodiment 2.
Figure 9:
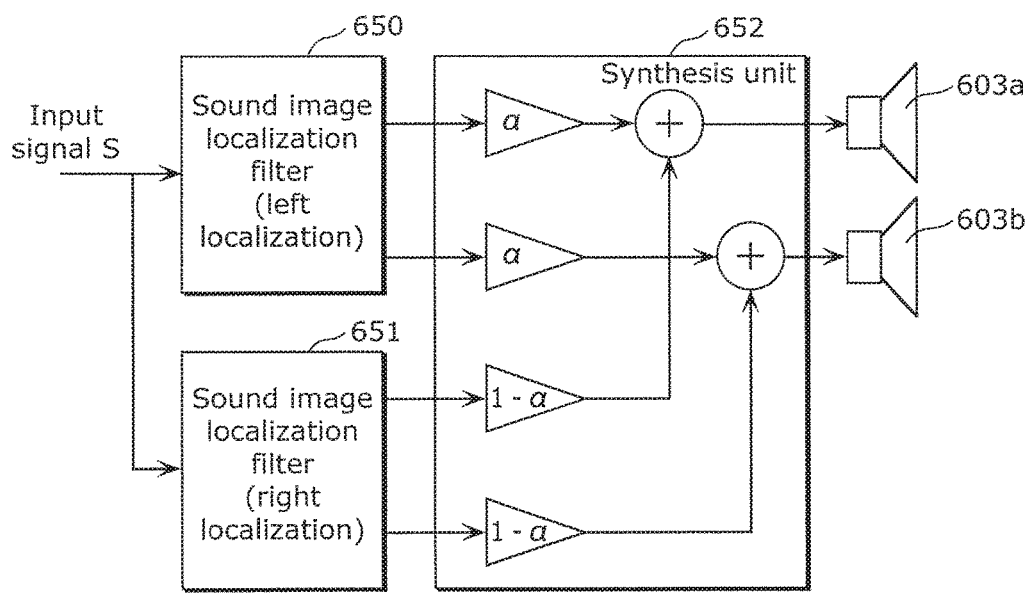
FIG. 9 is a diagram illustrating a related art for moving sound images.
Figure 10:
FIG. 10 is a figure illustrating a problem in the related art.
Figure 10:
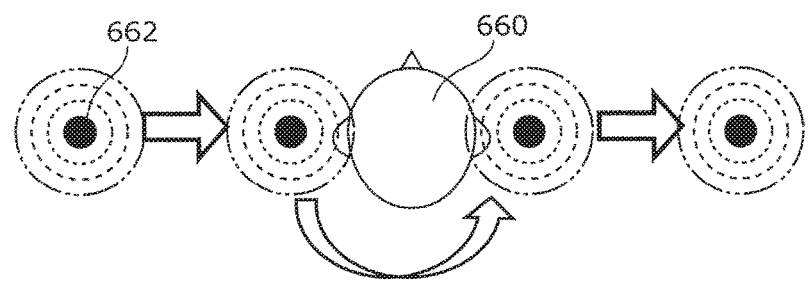
Figure 11:
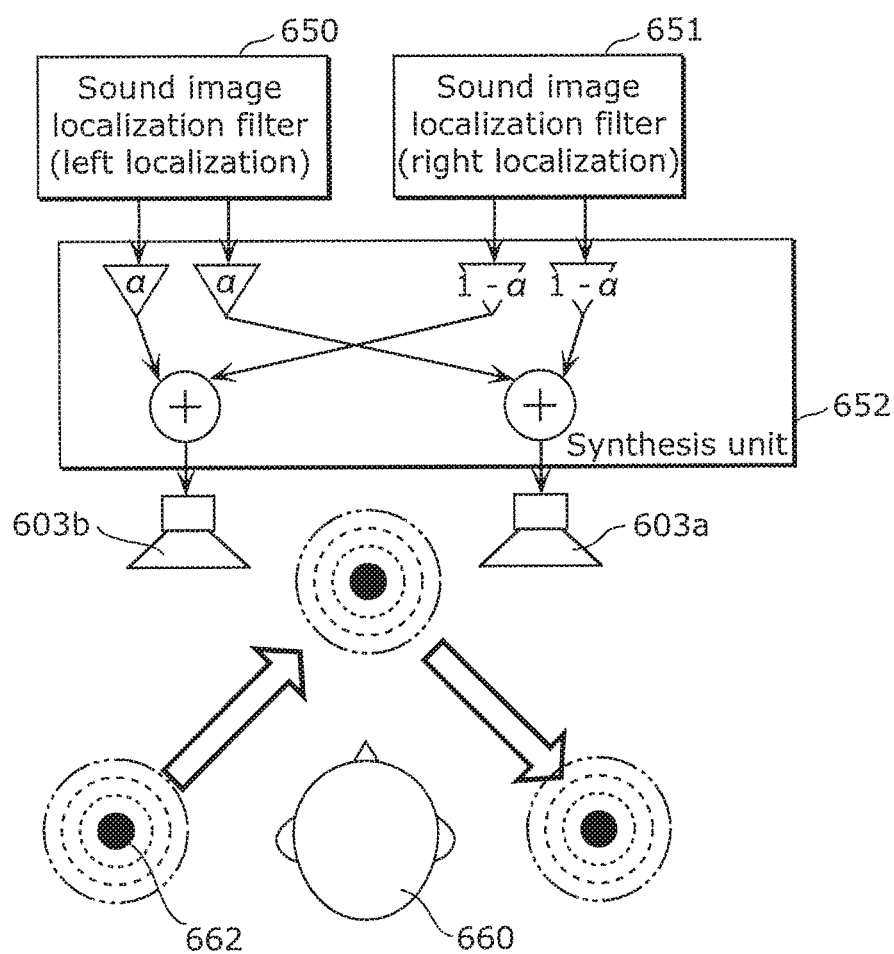
FIG. 11 is a figure illustrating a problem in the related art.

Furthermore, control may be performed to set the phase difference to 180 degrees at the time point T, by fixing one of the rotation angles (phase angles) and updating only the other rotation angle. FIG. 8 illustrates the structure in the above-described case. Note that, in FIG. 8, delay units which are required on paths with no phase rotation are not shown. The delay units provide the same time delay as the time delay which occurs in the phase rotation unit. The structure in FIG. 8 is simpler than the structure in FIG. 5. However, there remains an issue with the structure in FIG. 5: one of the speakers outputs, as sounds, signals with no phase rotation at all, which causes sounds from both speakers to have different tones. With the structure in FIG. 5, the sounds have even tones since signals from both phase rotation units go through the phase rotation processing, which allows performing the sound image moving processing while maintaining a natural tone.

As described above, according to the present embodiment, the signal processing device includes: a first phase rotation unit 300 which rotates the phase of the signal A by θ degrees; a second phase rotation unit 301 which rotates the phase of the signal A by −θ degrees; a third phase rotation unit 302 which rotates the phase of the signal B by −θ degrees; a fourth phase rotation unit 303 which rotates the phase of the signal B by θ degrees; a first adding unit 305 which adds a signal obtained by multiplying an output signal of the first phase rotation unit 300 by a weight and a signal obtained by multiplying an output signal of the third phase rotation unit 302 by a weight; a second adding unit 306 which adds a signal obtained by multiplying an output signal of the second phase rotation unit 301 by a weight and a signal obtained by multiplying an output signal of the fourth phase rotation unit 303 by a weight; and a control unit 304 which performs the transitions of θ and coefficients indicating the weights, over time. The control unit 304 controls the phase gradually so that θ is 0 degrees at a time point T0 and 90 degrees at a time point T1, and that the coefficients for use in the addition performed by the first adding unit 305 and the second adding unit 306 approach a same value as θ approaches 90 degrees. With this, an acoustic expression can be provided which makes the listener feel as if sound images localized at a predetermined position gradually move closer to the listener or as if the sound images localized at the position of the listener gradually move away from the listener.

The foregoing has described the signal processing device according to one or more embodiments of the present disclosure, however, the present disclosure is not limited to these embodiments. Other forms in which various modifications apparent to those skilled in the art are applied to the non-limiting embodiments, or forms structured by combining constituent elements of different non-limiting embodiments are included within the scope of one or more embodiments, unless such changes and modifications depart from the scope of the present disclosure.

INDUSTRIAL APPLICABILITY

A signal processing device according to the present disclosure provides such an acoustic effect which makes sound images of sound effect and voice of characters move closer to and away from a listener, and therefore can be applied to a variety of gaming equipment and amusement machines.

The invention claimed is:

1. A signal processing device comprising:
   a phase rotation unit A configured to rotate a phase of a signal A and generate two signals having a phase difference of $\theta$;
   a phase rotation unit B configured to rotate a phase of a signal B and generate two signals having a phase difference of $\theta$;
   a first adding unit configured to add: a signal obtained by multiplying a first output signal of the phase rotation unit A by a coefficient G1; and a signal obtained by multiplying a first output signal of the phase rotation unit B by a coefficient G2;
   a second adding unit configured to add: a signal obtained by multiplying a second output signal of the phase rotation unit A by the coefficient G2; and a signal obtained by multiplying a second output signal of the phase rotation unit B by the coefficient G1; and
   a control unit configured to perform transitions of $\theta$; the coefficient G1, and the coefficient G2, over time,
   wherein the control unit is configured to control phases so that $\theta$ is approximately 0 degrees at a time point T0 and $\theta$ is approximately 180 degrees at a time point T1, and control the coefficient G1 and the coefficient G2 so that the coefficient G1 is g when $\theta$ is 0 degrees and is h when $\theta$ is 180 degrees, and the coefficient G2 is 0 when $\theta$ is 0 degrees and is h when the $\theta$ is 180 degrees, g being a positive value and h being a positive value smaller than g.

2. The signal processing device according to claim 1, wherein the control unit is configured to control the coefficient G1 and the coefficient G2 so that the coefficient G1 is 0 when $\theta$ is 360 degrees and the coefficient G2 is g when $\theta$ is 360 degrees.

3. The signal processing device according to claim 1, wherein the phase rotation unit A includes:
   a first phase rotation unit configured to rotate the phase of the signal A by $\theta 1$ degrees and a second phase rotation unit configured to rotate the phase of the signal A by $-\theta 1$ degrees,
   the phase rotation unit B includes:
   a third phase rotation unit configured to rotate the phase of the signal B by $-\theta 1$ degrees and a fourth phase rotation unit configured to rotate the phase of the signal B by $\theta 1$ degrees, and
   $\theta 1$ is equal to $\theta/2$.

4. The signal processing device according to claim 1, wherein the signal A and the signal B are signals generated by a sound image localization filter for localizing a sound image of a signal S at a predetermined position by two speakers.

* * * * *